(12) United States Patent
Konopka et al.

(10) Patent No.: US 7,084,579 B2
(45) Date of Patent: Aug. 1, 2006

(54) TWO LIGHT LEVEL BALLAST

(75) Inventors: John G. Konopka, Deer Park, IL (US); Naveen Yadlapalli, Hoffman Estates, IL (US); Shashank Bakre, Schaumburg, IL (US); Himamshu Prasad, Round Lake, IL (US)

(73) Assignee: OSRAM Sylvania Inc., Danvers, MA (US)

( * ) Notice: Subject to any disclaimer, the term of this patent is extended or adjusted under 35 U.S.C. 154(b) by 94 days.

(21) Appl. No.: 11/010,845

(22) Filed: Dec. 13, 2004

(65) Prior Publication Data

US 2006/0125416 A1  Jun. 15, 2006

(51) Int. Cl.
*H05B 37/02* (2006.01)

(52) U.S. Cl. .................. 315/209 R; 315/307; 315/308; 315/291; 315/272

(58) Field of Classification Search ............ 315/209 R, 315/307–308, 291, 272; 363/87
See application file for complete search history.

(56) References Cited

U.S. PATENT DOCUMENTS

| | | | |
|---|---|---|---|
| 5,177,409 A | 1/1993 | Nilssen | 315/293 |
| 5,194,781 A | 3/1993 | Konopka | 315/291 |
| 5,373,218 A | 12/1994 | Konopka et al. | 315/291 |
| 5,475,285 A | 12/1995 | Konopka | 315/224 |
| 5,491,624 A * | 2/1996 | Levran et al. | 363/87 |
| 5,831,395 A * | 11/1998 | Mortimer et al. | 315/307 |
| 6,137,239 A * | 10/2000 | Wu et al. | 315/291 |
| 6,177,769 B1 * | 1/2001 | Bezdon et al. | 315/291 |

* cited by examiner

*Primary Examiner*—Tho Phan
*Assistant Examiner*—Chuc Tran
(74) *Attorney, Agent, or Firm*—Kenneth D. Labudda

(57) ABSTRACT

An electronic ballast (100) for powering at least one gas discharge lamp (30) at two light levels includes a full-wave rectifier circuit (120) and a detector circuit (200). Detector circuit (200) provides an output voltage that is dependent on the states of two on-off switches (S1,S2), but that is substantially unaffected by typical X capacitances that are present between the hot and neutral input connections of the ballast.

26 Claims, 2 Drawing Sheets

TWO LIGHT LEVEL BALLAST

FIELD OF THE INVENTION

The present invention relates to the general subject of circuits for powering discharge lamps. More particularly, the present invention relates to an electronic ballast that provides two light levels.

BACKGROUND OF THE INVENTION

Two light level lighting systems have been utilized in overhead lighting for many years. Typically, two light level systems are implemented by using two power switches and two ballasts in each lighting fixture, wherein each of the power switches controls only one of the ballasts in the fixture. Turning on both of the switches at the same time powers both ballasts, thus producing full light output from the fixture. Turning on only one of the switches applies power to only one of the ballasts in the lighting fixture and results in a reduced light level and a corresponding reduction in power consumed.

Because it is more economical to have a single ballast in the fixture instead of two, a system for producing the same result using only a single ballast is desirable. For compatibility purposes, the ballast would be required to operate from the same two power switches used in the two ballast system. When both switches are closed, the ballast would operate in a full light mode. Conversely, when only one of the two power switches is closed, the ballast would operate in a reduced light mode.

Two light level systems that require only a single ballast are known in the art. For example, U.S. Pat. No. 5,831,395 (issued to Mortimer) discloses one such system, which is described in FIG. 1. As shown in FIG. 1, the Mortimer system includes a detector circuit 270 that provides a control signal that is dependent on the states of two on-off switches S1 and S2. Theoretically, when only one of the switches S1,S2 is on, the control signal will be at a first level, causing the ballast to drive the lamp at a reduced light level; when both of the switches S1,S2 are on, the control signal will be at a second level, causing the ballast to drive the lamp at a higher light level.

Unfortunately, the Mortimer system has a major limitation in that detector circuit 270 may not function properly in the presence of X capacitances that are typically present between the hot and neutral wires that connect the ballast to the switches S1,S2 and the AC source. These X capacitances (denoted by dashed line/phantom capacitor symbols in FIG. 1) are present due to EMI circuitry in the ballast and/or the nature and length of the wiring between the AC source, switches S1,S2, and the ballast. Essentially, these X capacitances compromise the ability of detector circuit 270 to distinguish between a condition where only one switch is closed versus a condition where both switches are closed, and thus defeat the intended functionality of a two light level approach. This problem is particularly pronounced when multiple ballasts are connected to the same branch circuit, in which case the X capacitances due to the EMI circuitry in each ballast, and/or the wiring between the AC source, switches S1,S2, and each ballast, are additive.

What is needed, therefore, is a ballast that provides two light levels but that is substantially insensitive to the capacitances that are typically present in actual lighting installations. Such a ballast would represent a significant advance over the prior art.

DETAILED DESCRIPTION OF THE PREFERRED EMBODIMENTS

Figure 1:
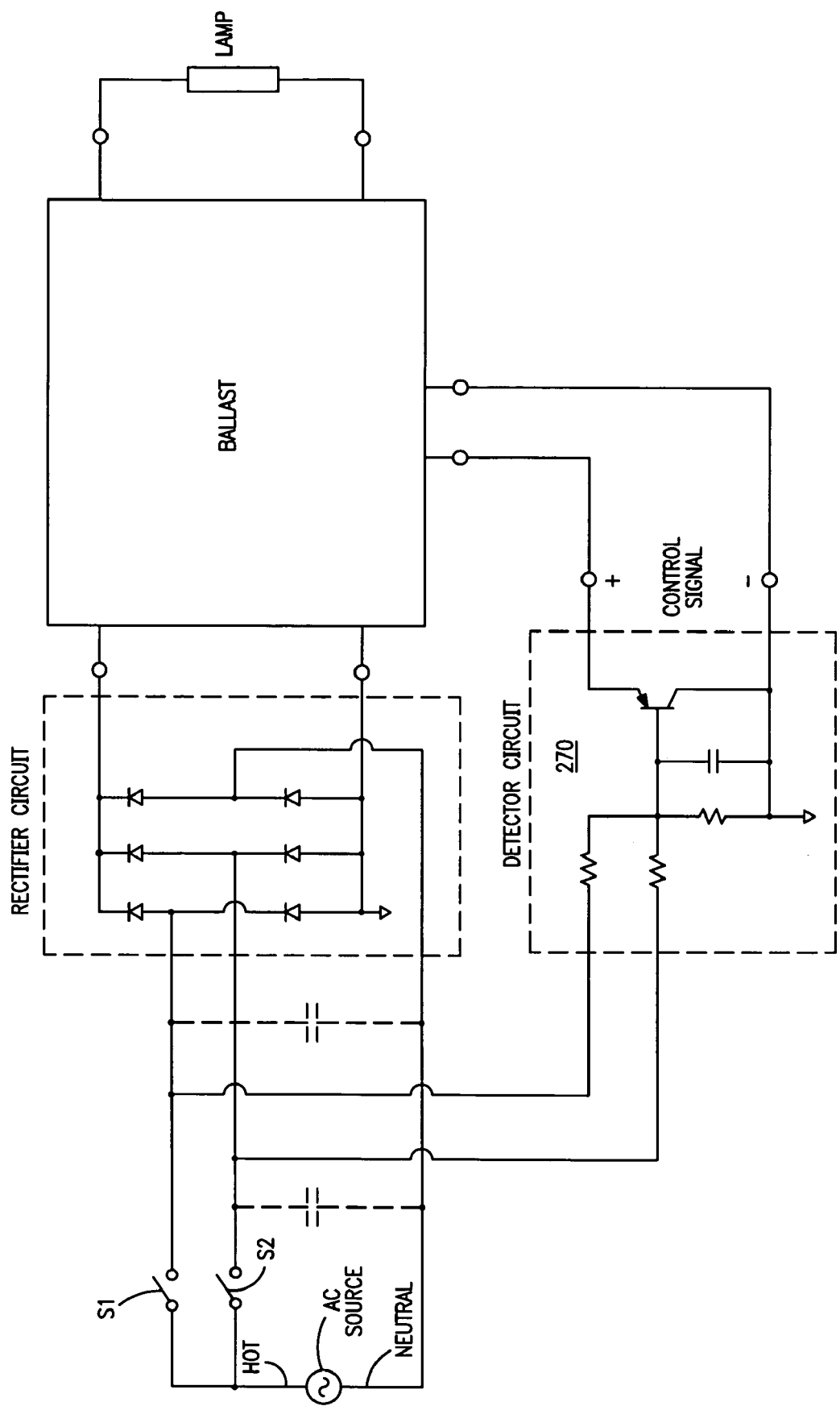
FIG. 1 is a schematic diagram of a two light level ballast, in accordance with the prior art.
Figure 2:
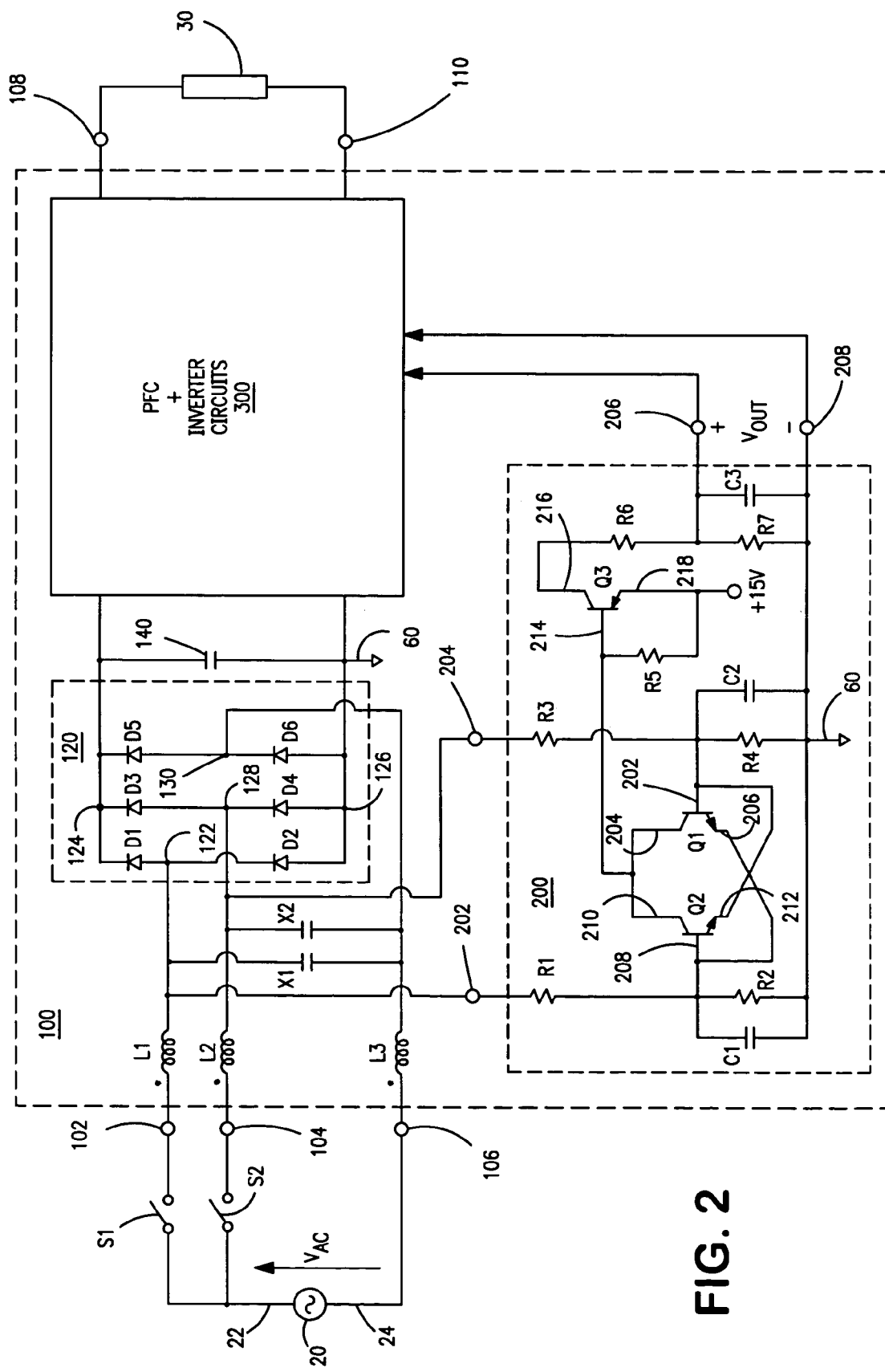
FIG. 2 is a schematic diagram of a two light level ballast, in accordance with a preferred embodiment of the present invention.

FIG. 2 describes a preferred structure for a ballast 100 for powering at least one gas discharge lamp 30 from an alternating current (AC) voltage source 20. Ballast 100 comprises a plurality of input connections 102,104,106, a full-wave rectifier circuit 120, electromagnetic interference (EMI) inductors L1,L2,L3, a detector circuit 200, power factor correction (PFC) and inverter circuits 300, and output connections 108,110 for coupling to at least one discharge lamp 30.

The plurality of input connections includes a first hot input connection 102, a second hot input connection 104, and a neutral input connection 106. First hot input connection 102 is adapted for coupling to a hot wire 22 of AC source 20 via a first on-off switch S1, while second hot input connection 104 is adapted for coupling to the hot wire 22 of AC source 20 via a second on-off switch S2. Switches S1 and S2 are typically implemented by conventional wall switches having an on state and an off state. Neutral input connection 106 is adapted for coupling to a neutral wire 24 of AC source 20.

Full-wave rectifier circuit 120 is coupled to first hot input connection 102 via first EMI inductor L1, to second input connection 104 via second EMI inductor L2, and to neutral input connection 106 via third EMI inductor.

Detector circuit 200 is coupled to first and second hot input connections 102,104 via first and second EMI inductors L1,L2. During operation, detector circuit 200 provides an output voltage, $V_{OUT}$, having a magnitude that is dependent on the states of switches S1,S2, but that is substantially unaffected by typical X capacitances being present between the hot input connections 102,104 and the neutral input connection 106.

Detector circuit 200 operates as follows. When both switches S1 and S2 are in the on state, the magnitude of $V_{OUT}$ is at a first level (e.g., 0 volts), causing the ballast (via PFC and inverter circuits 300) to operate lamp 30 at a first light level (e.g., 100% of full light output). When only one of the switches S1 and S2 is in the on state, the magnitude of $V_{OUT}$ is at a second level (e.g., 8 volts), causing the ballast to operate lamp 30 at a second light level (e.g., 50% of full light output).

PFC and inverter circuits 300 may be realized by any of a number of arrangements that are well known to those skilled in the art, and thus will not be described in any further detail herein. For example, PFC and inverter circuit 300 may be implemented using a boost converter followed by a driven series resonant half-bridge inverter. For purposes of the present invention, it is required only that PFC and inverter circuit 300 are capable of responding to the output, $V_{OUT}$, of detector circuit 200 in the manner previously described. More specifically, PFC and inverter circuits 300 should power lamp 30 at the first light level (e.g., 100% of full light output) when $V_{OUT}$ is at the first level (e.g., zero volts), and at the second light level (e.g., 50% of full light output) when $V_{OUT}$ is at the second level (e.g., 8 volts).

Preferably, as shown in FIG. 2, full-wave rectifier circuit 120 is implemented by an arrangement comprising six diodes D1,D2,D3,D4,D5,D6. First diode D1 has an anode coupled to a first node 122 and a cathode coupled to a second node 124; first node 122 is coupled to first hot input connection 102 via first EMI inductor L1. Second diode D2 has an anode coupled to a third node 126 and a cathode coupled to first node 122; third node is coupled to circuit ground 60. Third diode D3 has an anode coupled to a fourth node 128 and a cathode coupled to second node 124; fourth node 128 is coupled to second hot input connection 104 via second EMI inductor L2. Fourth diode D4 has an anode coupled to third node 126 and a cathode coupled to fourth node 128. Fifth diode D5 has an anode coupled to a fifth node 130 and a cathode coupled to second node 124; fifth node 130 is coupled to neutral input connection 106 via third EMI inductor L3. Sixth diode D6 has an anode coupled to third node 126 and a cathode coupled to fifth node 130. During operation, rectifier circuit 120 receives the sinusoidal AC voltage provided by AC source 20 and provides a full-wave rectified voltage to the PFC and inverter circuits 300. Capacitor 140 serves as a high frequency bypass capacitor.

As described in FIG. 2, first EMI inductor L1 is coupled between first hot input connection 102 and first node 122. Second EMI inductor L2 is coupled between second hot input connection 104 and fourth node 128. Third EMI inductor L3 is coupled between neutral input connection 106 and fifth node 130.

Preferably, as described in FIG. 2, detector circuit 200 comprises a first input terminal 202, a second input terminal 204, first and second output terminals 206,208, a first transistor Q1, a second transistor Q2, a third transistor Q3, a first resistor R1, a second resistor R2, a third resistor R3, a fourth resistor R4, a fifth resistor R5, a sixth resistor R6, a seventh resistor R7, a first capacitor C1, a second capacitor C2, and a third capacitor C3. First input terminal 202 is coupled to first node 122 and first hot input connection 102. Second input terminal 204 is coupled to fourth node 128 and second hot input connection 104. First and second output terminals 206,208 are coupled to PFC and inverter circuits 300; second output terminal 208 is coupled to circuit ground 60. First transistor Q1 is preferably implemented as a NPN type bipolar junction transistor having a base 202, a collector 204, and an emitter 206. Second transistor Q2 is preferably implemented as a NPN type bipolar junction transistor having a base 208, a collector 210, and an emitter 212. Third transistor Q3 is preferably implemented as a PNP type bipolar junction transistor having a base 214, a collector 216, and an emitter 218. The collector 204 of first transistor Q1 is coupled to the collector 210 of second transistor Q2. The emitter 206 of first transistor Q1 is coupled to the base 208 of second transistor Q2. The emitter 212 of second transistor Q2 is coupled to the base 202 of first transistor Q1. First resistor R1 is coupled between first input terminal 202 and the base 208 of second transistor Q2. Second resistor R2 is coupled between the base 208 of second transistor Q2 and circuit ground 60. First capacitor C1, which is present to provide noise suppression, is likewise coupled between the base 208 of second transistor Q2 and circuit ground 60. Third resistor R3 is coupled between second input terminal 204 and the base 202 of first transistor Q1. Fourth resistor R4 is coupled between the base 202 of first transistor Q1 and circuit ground 60. Second capacitor C2, which is present to provide noise suppression, is likewise coupled between the base 202 of first transistor Q1 and circuit ground 60. Third transistor Q3 is preferably implemented as a PNP type bipolar junction transistor having a base 214, a collector 216, and an emitter 218. The base 214 of transistor Q3 is coupled to the collectors 204,210 of first and second transistors Q1,Q2. The emitter 218 of third transistor Q3 is coupled to a DC supply voltage (e.g., +18 volts). Fifth resistor R5 is coupled between the base 214 and emitter 218 of third transistor Q3. Sixth resistor R6 is coupled between the collector 216 of third transistor Q3 and first output terminal 206. Seventh resistor R7 and third capacitor C3 are each coupled between first and second output terminals 206,208.

The detailed operation of ballast 100 and detector circuit 200 is now described with reference to FIG. 2 as follows. The four operating conditions of interest are: (i) S1 and S2 off; (b) S1 and S2 on; (c) S1 on and S2 off; and (d) S1 off and S2 on. In the following description, an X capacitance is assumed to be present between each of the hot input connections 102,104 and the neutral input connection 106. The frequency of AC source 20 is assumed to be 60 hertz. Additionally, unless stated otherwise, all voltages should be understood to be referenced to circuit ground 60.

(a) When both switches S1 and S2 are off, no power is applied to ballast 100 and lamp 30 is not illuminated.

(b) When both switches S1 and S2 are on, $V_{OUT}$ will be at the first level (e.g., zero volts) and lamp 30 will be illuminated at a full light level. This occurs as follows. During the positive half cycles of $V_{AC}$, equal positive pulsating voltages (i.e., having the same magnitude and phase and being approximately equal to a positive half cycle of $V_{AC}$) will be present at both input terminals 202,204 of detector circuit 200. Consequently, the base voltages at each transistor Q1,Q2 will be equal (due to the fact that R1,R3 have the same resistance, and R2,R4 have the same resistance). Because the base of each transistor Q1,Q2 is coupled to the emitter of the other transistors Q2,Q1, the base-to-emitter voltage for each transistor Q1,Q2 will be zero, causing both transistors Q1,Q2 to be off. With both transistors Q1,Q2 off, Q3 will likewise be off. As a result, $V_{OUT}$ will be zero. During the negative half cycles of $V_{AC}$, the voltages at both input terminals 202,204 of detector circuit 200 will be zero. Consequently, the base voltages and base-to-emitter voltages for each transistor Q1,Q2 will be zero, causing both transistor Q1,Q2 to be off. With both transistors Q1,Q2 off, Q3 will likewise be off, and $V_{OUT}$ will remain at zero. Thus, when both switches S1 and S2 are on, $V_{OUT}$ will be zero.

(c) When switch S1 is on and switch S2 is off, $V_{OUT}$ will be at the second level (e.g., 8 volts) and lamp 30 will be illuminated at a reduced light level. This occurs as follows. During the positive half cycles of $V_{AC}$, a pulsating positive voltage (i.e., approximately equal to a positive half cycle of $V_{AC}$) will be present at first input terminal 202 and zero voltage will be present at second input terminal 204. Consequently, the base-to-emitter voltage of Q2 will be positive and the base-to-emitter voltage of Q1 will be near zero. As a result, Q2 will be on (once the voltage at input terminal 202 reaches a level sufficient to cause at least 0.6 volts to appear at the base-to-emitter junction of Q2) and Q1 will be off. With Q2 on, the base 214 of Q3 will be pulled low, causing Q3 to turn on, resulting in the development of a positive voltage across output terminals 206,208. Q2 and Q3 will remain on until the voltage at input terminal 202 falls below the aforementioned sufficient level, at which point Q2 and Q3 will turn off. Conversely, during the negative half cycles of $V_{AC}$, a positive voltage will be present at second input terminal 204 and zero voltage will be present at first input terminal 202. It should be appreciated that the positive voltage at second input terminal 204 during the negative half cycles of $V_{AC}$ occurs only because of the presence of an X capacitance (i.e., X2) between second hot input connection 104 and neutral input connection 106; in the absence of the X capacitance, the voltage at second input terminal 204 would be zero during the negative half cycles of $V_{AC}$. Consequently, the base-to-emitter voltage of Q1 will be positive and the base-to-emitter voltage of Q2 will be near zero. As a result, Q1 will be on (once the voltage at input terminal 204 reaches a level sufficient to cause at least 0.6 volts to appear at the base-to-emitter junction of Q1) and Q2 will be off. With Q1 on, the base 214 of Q3 will be pulled low, causing Q3 to turn on, resulting in the development of a positive voltage across output terminals 206,208. Thus, over the positive and negative half cycles of $V_{AC}$, Q1 and Q2 will alternately turn on and off over a portion of each half cycle, with the result that Q3 will turn on and off at a 120 hertz rate and with a duty cycle of approximately 40% (i.e., Q3 will be on 40% of the time, and off the remaining 60% of the time). Due to the filtering action of capacitor C3, $V_{OUT}$ will be at the second level (e.g., 8 volts), causing lamp 30 to be illuminated at a reduced light level (e.g., 50% of full light output).

(d) When switch S1 is off and switch S2 is on, $V_{OUT}$ will be the same as when S1 is on and S2 is off (i.e., VOUT will be at the second level and lamp 30 will be illuminated at a reduced light level). During the positive half cycles of $V_{AC}$, a pulsating positive voltage (i.e., approximately equal to a positive half cycle of $V_{AC}$) will be present at second input terminal 204 and zero voltage will be present at first input terminal 202. Consequently, the base-to-emitter voltage of Q1 will be positive and the base-to-emitter voltage of Q2 will be zero. As a result, Q1 will be on (once the voltage at input terminal 204 reaches a level sufficient to cause at least 0.6 volts to appear at the base-to-emitter junction of Q1) and Q2 will be off. With Q1 on, the base 214 of Q3 will be pulled low, causing Q3 to turn on, resulting in the development of a positive voltage across output terminals 206,208. Conversely, during the negative half cycles of $V_{AC}$, a positive voltage will be present at first input terminal 202 and zero voltage will be present at second input terminal 204. It should be appreciated that the positive voltage at first input terminal 202 during the negative half cycles of $V_{AC}$ occurs only because of the presence of an X capacitance (i.e., X1) between first hot input connection 102 and neutral input connection 106; in the absence of the X capacitance, the voltage at first input terminal 202 would be zero during the negative half cycles of $V_{AC}$. Consequently, the base-to-emitter voltage of Q2 will be positive and the base-to-emitter voltage of Q1 will be near zero. As a result, Q2 will be on (once the voltage at input terminal 202 reaches a level sufficient to cause at least 0.6 volts to appear at the base-to-emitter junction of Q2) and Q1 will be off. With Q2 on, the base 214 of Q3 will be pulled low, causing Q3 to turn on, resulting in the development of a positive voltage across output terminals 206,208. Thus, over the positive and negative half cycles of $V_{AC}$, Q1 and Q2 will alternately turn on and off over a portion of each half cycle, with the result that Q3 will turn on and off at a 120 hertz rate and with a duty cycle of approximately 40% (i.e., Q3 will be on 40% of the time, and off the remaining 60% of the time). Due to the filtering action of C3, $V_{OUT}$ will be at the second level (e.g., 8 volts), causing lamp 30 to be illuminated at a reduced light level (e.g., 50% of full light output).

A prototype ballast configured substantially as described in FIG. 2 was built and tested. Detector circuit 200 was observed to operate reliably in the presence of X capacitances (connected between each of the hot input connections 102,104 and neutral input connection 106) up to at least 15 microfarads, which is at least several orders or magnitude greater than the typical X capacitances that will be encountered in an actual ballast installation involving a large number of ballasts connected to the same branch circuit. Thus, the operation of detector circuit 200 is considered to be immune to any negative effects due to typical X capacitances.

Preferred values for the components of detector circuit 200 are given as follows:

Q1,Q2: 2N3904
Q3: 2N3906
R1,R4: 1 M'Ω
R2,R3: 15 k'Ω
R5: 10 k'Ω
R6: 5 k'Ω
R7: 10 k'Ω
C1,C2: 0.15 microfarad
C3: 10 microfarad Preferably, ballast 100 further includes a pair of X capacitors X1,X2 that are believed to render detector circuit 200 substantially immune to capacitances that, due to wiring lengths and other factors, may be present between the first and second hot input connections 102,104. As shown in FIG., 2, first X capacitor X1 is coupled between first hot input connection 102 and neutral input connection 106. Second X capacitor X2 is coupled between second hot input connection 104 and neutral input connection 106. In a prototype ballast, capacitors X1 and X2 were chosen to each have a capacitance on the order of about 0.15 microfarads.

Preferably, EMI inductors L1,L2,L3 are implemented using a single magnetic assembly (i.e., the windings for all three inductors are wound on the same bobbin). Further, for purposes of minimizing EMI, it is preferred that the bobbin for the magnetic assembly include separate sectors, and that the winding for each inductor L1,L2,L3 be situated in its own sector(s), thus providing relatively loose coupling between the three inductors. This is in contrast with the more conventional approach of situating windings L1 and L2 in the same sector, with one winding wound on the top of the other (which provides tight coupling between L1 and L2), and placing the winding for L3 in a different sector (which provides loose coupling between L3 and the other two windings L1,L2). In a prototype ballast configured substantially as described in FIG. 2, inductors L1,L2,L3 were implemented by a single magnetic assembly with the following pertinent specifications:

Bobbin: EF25, 4 sectors
(from left to right: sector 1, sector 2, sector 3, sector 4)
Cores: EF25/13/7, ungapped
L1 winding: 100 turns #29H AWG wire, wound in sector 3
L2 winding: 100 turns #29H AWG wire, wound in sector 4
L3 winding: 100 turns #27H AWG wire, wound in sectors 1 and 2
Inductance of L1,L2,L3: 29 millihenries (nominal)
Polarities of L1,L2,L3: As indicated by the dots shown in FIG. 2

Although the present invention has been described with reference to certain preferred embodiments, numerous modifications and variations can be made by those skilled in the art without departing from the novel spirit and scope of this invention.

What is claimed is:

1. A ballast for powering at least one gas discharge lamp from an alternating current (AC) voltage source, the ballast comprising:
   a first hot input connection adapted for coupling to a hot wire of the AC voltage source via a first switch, the first switch having an on state and an off state;
   a second hot input connection adapted for coupling to the hot wire of the AC voltage source via a second switch, the second switch having an on state and an off state;
   a neutral input connection adapted for coupling to a neutral wire of the AC voltage source;
   a full-wave rectifier circuit coupled to the first hot input connection, the second hot input connection, and the neutral input connection; and
   a detector circuit coupled to the first and second hot input connections, the detector circuit being operable to provide an output voltage having a magnitude that is dependent on the states of the first and second switches but that is substantially unaffected by typical X capacitances being present between the hot input connections and the neutral input connection.

2. The ballast of claim 1, wherein the detector circuit is further operable such that:
   (i) in response to both the first and second switches being in the on state, the magnitude of the output voltage is at a first level; and
   (ii) in response to only one of the first and second switches being in the on state, the magnitude of the output voltage is at a second level.

3. The ballast of claim 2, wherein the first level is approximately zero volts and the second level is approximately 8 volts.

4. The ballast of claim 1, wherein the detector circuit comprises:
   a first input terminal coupled to the first hot input connection;
   a second input terminal coupled to the second hot input connection;
   first and second output terminals, wherein the second output terminal is coupled to circuit ground;
   a first transistor having a base, an emitter, and a collector; and
   a second transistor having a base, an emitter, and a collector, wherein the collector of the first transistor is coupled to the collector of the second transistor, the emitter of the first transistor is coupled to the base of the second transistor, and the emitter of the second transistor is coupled to the base of the first transistor.

5. The ballast of claim 4, wherein the detector circuit further comprises:
   a first resistor coupled between the first input terminal and the base of the second transistor;
   a second resistor coupled between the base of the second transistor and circuit ground;
   a third resistor coupled between the second input terminal and the base of the first transistor; and
   a fourth resistor coupled between the base of the first transistor and circuit ground.

6. The ballast of claim 5, wherein the detector circuit further comprises:
   a third transistor having a base, an emitter, and a collector, wherein the base of the third transistor is coupled to the collectors of the first and second transistors, and the emitter of the third transistor is coupled to a DC supply voltage;
   a fifth resistor coupled between the base and emitter of the third transistor;
   a sixth resistor coupled between the collector of the third transistor and the first output terminal;
   a seventh resistor coupled between the first and second output terminals; and
   a capacitor coupled between the first and second output terminals.

7. The ballast of claim 6, wherein:
   the first and second transistors are NPN type bipolar junction transistors; and
   the third transistor is a PNP type bipolar junction transistor.

8. The ballast of claim 1, further comprising:
   a first X capacitor coupled between the first hot input connection and the neutral input connection; and
   a second X capacitor coupled between the second hot input connection and the neutral input connection.

9. The ballast of claim 1, further comprising:
   a first electromagnetic interference (EMI) inductor coupled between the first hot input connection and the full-wave rectifier circuit, wherein the detector circuit is coupled to the first hot input connection via the first EMI inductor;
   a second EMI inductor coupled between the second hot input connection and the full-wave rectifier circuit, wherein the detector circuit is coupled to the second hot input connection via the second EMI inductor; and
   a third EMI inductor coupled between the neutral input connection and the full-wave rectifier circuit, wherein the first, second, and third EMI inductors are loosely coupled to each other.

10. The ballast of claim 1, wherein the full-wave rectifier circuit comprises:
    a first diode having an anode coupled to a first node and a cathode coupled to a second node, the first node being coupled to the first hot input connection;
    a second diode having an anode coupled to a third node and a cathode coupled to the first node, the third node being coupled to circuit ground;
    a third diode having an anode coupled to a fourth node and a cathode coupled to the second node, the fourth node being coupled to the second hot input connection;
    a fourth diode having an anode coupled to the third node and a cathode coupled to the fourth node;
    a fifth diode having an anode coupled to a fifth node and a cathode coupled to the second node, the fifth node being coupled to the neutral input connection; and
    a sixth diode having an anode coupled to the third node and a cathode coupled to the fifth node.

11. The ballast of claim 10, wherein the detector circuit comprises:
    a first input terminal coupled to the first node;
    a second input terminal coupled to the fourth node;
    first and second output terminals, wherein the second output terminal is coupled to circuit ground;
    a first transistor having a base, an emitter, and a collector; and
    a second transistor having a base, an emitter, and a collector, wherein the collector of the first transistor is coupled to the collector of the second transistor, the emitter of the first transistor is coupled to the base of the second transistor, and the emitter of the second transistor is coupled to the base of the first transistor.

12. The ballast of claim 10, wherein the detector circuit further comprises:
   a first resistor coupled between the first input terminal and the base of the second transistor;
   a second resistor coupled between the base of the second transistor and circuit ground;
   a third resistor coupled between the second input terminal and the base of the first transistor; and
   a fourth resistor coupled between the base of the first transistor and circuit ground.

13. The ballast of claim 12, wherein the detector circuit further comprises:
   a third transistor having a base, an emitter, and a collector, wherein the base of the third transistor is coupled to the collectors of the first and second transistors, and the emitter of the third transistor is coupled to a DC supply voltage;
   a fifth resistor coupled between the base and emitter of the third transistor;
   a sixth resistor coupled between the collector of the third transistor and the first output terminal;
   a seventh resistor coupled between the first and second output terminals; and
   a capacitor coupled between the first and second output terminals.

14. The ballast of claim 13, wherein:
   the first and second transistors are NPN type bipolar junction transistors; and
   the third transistor is a PNP type bipolar junction transistor.

15. The ballast of claim 13, further comprising:
   a first X capacitor coupled between the first and fifth nodes; and
   a second X capacitor coupled between the fourth and fifth nodes.

16. The ballast of claim 13, further comprising:
   a first electromagnetic interference (EMI) inductor coupled between the first hot input connection and the first node;
   a second EMI inductor coupled between the second hot input connection and the fourth node; and
   a third EMI inductor coupled between the neutral input connection and the fifth node, wherein the first, second, and third EMI inductors are: (i) disposed on a single magnetic assembly; and (ii) loosely coupled to each other.

17. A ballast for powering at least one gas discharge lamp from an alternating current (AC) voltage source, the ballast comprising:
   a first hot input connection adapted for coupling to a hot wire of the AC voltage source via a first switch, the first switch having an on state and an off state;
   a second hot input connection adapted for coupling to the hot wire of the AC voltage source via a second switch, the second switch having an on state and an off state;
   a neutral input connection adapted for coupling to a neutral wire of the AC voltage source;
   a full-wave rectifier circuit coupled to the first hot input connection, the second hot input connection, and the neutral input connection; and
   a detector circuit, comprising:
      a first input terminal coupled to the first hot input connection;
      a second input terminal coupled to the second hot input connection;
      first and second output terminals, wherein the second output terminal is coupled to circuit ground;
      a first transistor having a base, an emitter, and a collector;
      a second transistor having a base, an emitter, and a collector, wherein the collector of the first transistor is coupled to the collector of the second transistor, the emitter of the first transistor is coupled to the base of the second transistor, and the emitter of the second transistor is coupled to the base of the first transistor;
      a first resistor coupled between the first input terminal and the base of the second transistor;
      a second resistor coupled between the base of the second transistor and circuit ground;
      a third resistor coupled between the second input terminal and the base of the first transistor; and
      a fourth resistor coupled between the base of the first transistor and circuit ground.

18. The ballast of claim 17, wherein the detector circuit further comprises:
   a third transistor having a base, an emitter, and a collector, wherein the base of the third transistor is coupled to the collectors of the first and second transistors, and the emitter of the third transistor is coupled to a DC supply voltage;
   a fifth resistor coupled between the base and emitter of the third transistor;
   a sixth resistor coupled between the collector of the third transistor and the first output terminal;
   a seventh resistor coupled between the first and second output terminals; and
   a capacitor coupled between the first and second output terminals.

19. The ballast of claim 18, wherein:
   the first and second transistors are NPN type bipolar junction transistors; and
   the third transistor is a PNP type bipolar junction transistor.

20. The ballast of claim 18, further comprising:
   a first X capacitor coupled between the first hot input connection and the neutral input connection; and
   a second X capacitor coupled between the second hot input connection and the neutral input connection.

21. The ballast of claim 17, wherein the full-wave rectifier circuit comprises:
   a first diode having an anode coupled to a first node and a cathode coupled to a second node, the first node being coupled to the first hot input connection;
   a second diode having an anode coupled to a third node and a cathode coupled to the first node, the third node being coupled to circuit ground;
   a third diode having an anode coupled to a fourth node and a cathode coupled to the second node, the fourth node being coupled to the second hot input connection;
   a fourth diode having an anode coupled to the third node and a cathode coupled to the fourth node;
   a fifth diode having an anode coupled to a fifth node and a cathode coupled to the second node, the fifth node being coupled to the neutral input connection; and
   a sixth diode having an anode coupled to the third node and a cathode coupled to the fifth node.

22. The ballast of claim 21, wherein the detector circuit further comprises:
   a third transistor having a base, an emitter, and a collector, wherein the base of the third transistor is coupled to the collectors of the first and second transistors, and the emitter of the third transistor is coupled to a DC supply voltage;

a fifth resistor coupled between the base and emitter of the third transistor;

a sixth resistor coupled between the collector of the third transistor and the first output terminal;

a seventh resistor coupled between the first and second output terminals; and a capacitor coupled between the first and second output terminals.

23. The ballast of claim 22, wherein:

the first and second transistors are NPN type bipolar junction transistors; and the third transistor is a PNP type bipolar junction transistor.

24. The ballast of claim 22, further comprising:

a first X capacitor coupled between the first and fifth nodes; and a second X capacitor coupled between the fourth and fifth nodes.

25. The ballast of claim 22, further comprising:

a first electromagnetic interference (EMI) inductor coupled between the first hot input connection and the first node, wherein the first input terminal of the detector circuit is coupled to the first hot input connection via the first EMI inductor;

a second EMI inductor coupled between the second hot input connection and the fourth node, wherein the second input terminal of the detector circuit is coupled to the second hot input connection via the second EMI inductor; and a third EMI inductor coupled between the neutral input connection and the fifth node.

26. A ballast for powering at least one gas discharge lamp from an alternating current (AC) voltage source, the ballast comprising:

a first hot input connection adapted for coupling to a hot wire of the AC voltage source via a first switch, the first switch having an on state and an off state;

a second hot input connection adapted for coupling to the hot wire of the AC voltage source via a second switch, the second switch having an on state and an off state;

a neutral input connection adapted for coupling to a neutral wire of the AC voltage source;

a full-wave rectifier circuit, comprising:

a first diode having an anode coupled to a first node and a cathode coupled to a second node, the first node being coupled to the first hot input connection;

a second diode having an anode coupled to a third node and a cathode coupled to the first node, the third node being coupled to circuit ground;

a third diode having an anode coupled to a fourth node and a cathode coupled to the second node, the fourth node being coupled to the second hot input connection;

a fourth diode having an anode coupled to the third node and a cathode coupled to the fourth node;

a fifth diode having an anode coupled to a fifth node and a cathode coupled to the second node, the fifth node being coupled to the neutral input connection; and a sixth diode having an anode coupled to the third node and a cathode coupled to the fifth node;

a first electromagnetic interference (EMI) inductor coupled between the first hot input connection and the first node;

a second EMI inductor coupled between the second hot input connection and the fourth node;

a third EMI inductor coupled between the neutral input connection and the fifth node;

a first X capacitor coupled between the first and fifth nodes;

a second X capacitor coupled between the fourth and fifth nodes; and a detector circuit, comprising:

a first input terminal coupled to the first node;

a second input terminal coupled to the fourth node;

first and second output terminals, wherein the second output terminal is coupled to circuit ground;

a first transistor having a base, an emitter, and a collector, wherein the first transistor is a NPN type bipolar junction transistor;

a second transistor having a base, an emitter, and a collector, wherein the collector of the first transistor is coupled to the collector of the second transistor, the emitter of the first transistor is coupled to the base of the second transistor, and the emitter of the second transistor is coupled to the base of the first transistor, wherein the second transistor is a NPN type bipolar junction transistor;

a first resistor coupled between the first input terminal and the base of the second transistor;

a second resistor coupled between the base of the second transistor and circuit ground;

a third resistor coupled between the second input terminal and the base of the first transistor;

a fourth resistor coupled between the base of the first transistor and circuit ground;

a third transistor having a base, an emitter, and a collector, wherein the base of the third transistor is coupled to the collectors of the first and second transistors, and the emitter of the third transistor is coupled to a DC supply voltage, wherein the third transistor is a PNP type bipolar junction transistor;

a fifth resistor coupled between the base and emitter of the third transistor;

a sixth resistor coupled between the collector of the third transistor and the first output terminal;

a seventh resistor coupled between the first and second output terminals; and a capacitor coupled between the first and second output terminals.

* * * * *